(12) United States Patent
Shlomo et al.

(10) Patent No.: US 12,476,977 B2
(45) Date of Patent: Nov. 18, 2025

(54) NETWORK USER PERMISSION PREDICTION

(71) Applicant: CHECK POINT SOFTWARE TECHNOLOGIES LTD., Tel Aviv (IL)

(72) Inventors: Yosef Ben Shlomo, Givatayim (IL); Ori Joseph, Petah Tikva (IL); Erez Israel, Tel Aviv (IL); Eliya Moreinis Adar, Luzit (IL); Arie Blumin, Tel Aviv (IL)

(73) Assignee: CHECK POINT SOFTWARE TECHNOLOGIES LTD., Tel Aviv (IL)

( * ) Notice: Subject to any disclaimer, the term of this patent is extended or adjusted under 35 U.S.C. 154(b) by 197 days.

(21) Appl. No.: 18/452,627

(22) Filed: Aug. 21, 2023

(65) Prior Publication Data

US 2025/0071119 A1 Feb. 27, 2025

(51) Int. Cl.
*H04L 9/40* (2022.01)
*G06N 5/01* (2023.01)
*G06N 20/00* (2019.01)
*G06N 20/20* (2019.01)

(52) U.S. Cl.
CPC ........... *H04L 63/105* (2013.01); *G06N 20/00* (2019.01)

(58) Field of Classification Search
CPC ........ H04L 63/105; G06N 20/00; G06N 5/01; G06N 20/20
See application file for complete search history.

(56) References Cited

U.S. PATENT DOCUMENTS

2021/0075794 A1\* 3/2021 Gazit .................. H04L 63/1408
2023/0110080 A1\* 4/2023 Hen ...................... H04L 63/105
726/4

\* cited by examiner

*Primary Examiner* — Shirley X Zhang
(74) *Attorney, Agent, or Firm* — Renner, Otto, Boisselle & Sklar, LLP

(57) ABSTRACT

A device and method for employing a machine learning model using processor circuitry to intelligently predict user permissions within a network environment and output a restriction recommendation for modifying user permissions.

20 Claims, 3 Drawing Sheets

NETWORK USER PERMISSION PREDICTION

TECHNICAL FIELD

The present disclosure relates generally to network security and more particularly to user permissions and roles in cloud environments.

BACKGROUND

Cloud computing environments, including services provided by platforms such as Amazon Web Services (AWS), have revolutionized the way organizations manage and deploy their applications and data. One of the critical aspects of managing such environments is ensuring that user roles are correctly defined with the necessary permissions to ensure that sensitive resources are protected while still allowing for effective operations.

User roles and their associated permissions are paramount to the integrity of data and the functionality of applications within the cloud. Each role is typically associated with a set of permissions that define what actions can be taken by a user or service that assumes that role. However, there has been an ongoing challenge of ensuring that these permissions are not overly permissive. Overly permissive roles can pose a significant security risk, as attackers who gain unauthorized access to user accounts can exploit excessive permissions to their advantage.

SUMMARY

Current state-of-the-art solutions for addressing this challenge adopt a retrospective approach. Such methods typically analyze historical data to observe which permissions were utilized over a given time frame, such as the past 90 days. Based on this historical usage data, these solutions then propose the removal of unused permissions. However, this approach is inherently limited as it does not anticipate future requirements. There is a considerable risk of removing permissions that users might need in the future, which could potentially hamper the operations and lead to service disruptions.

The present disclosure provides a novel method for effectively predicting permissions needed by a user using a machine learning model and network activity logs.

While a number of features are described herein with respect to embodiments of the invention, features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

Figure 1:
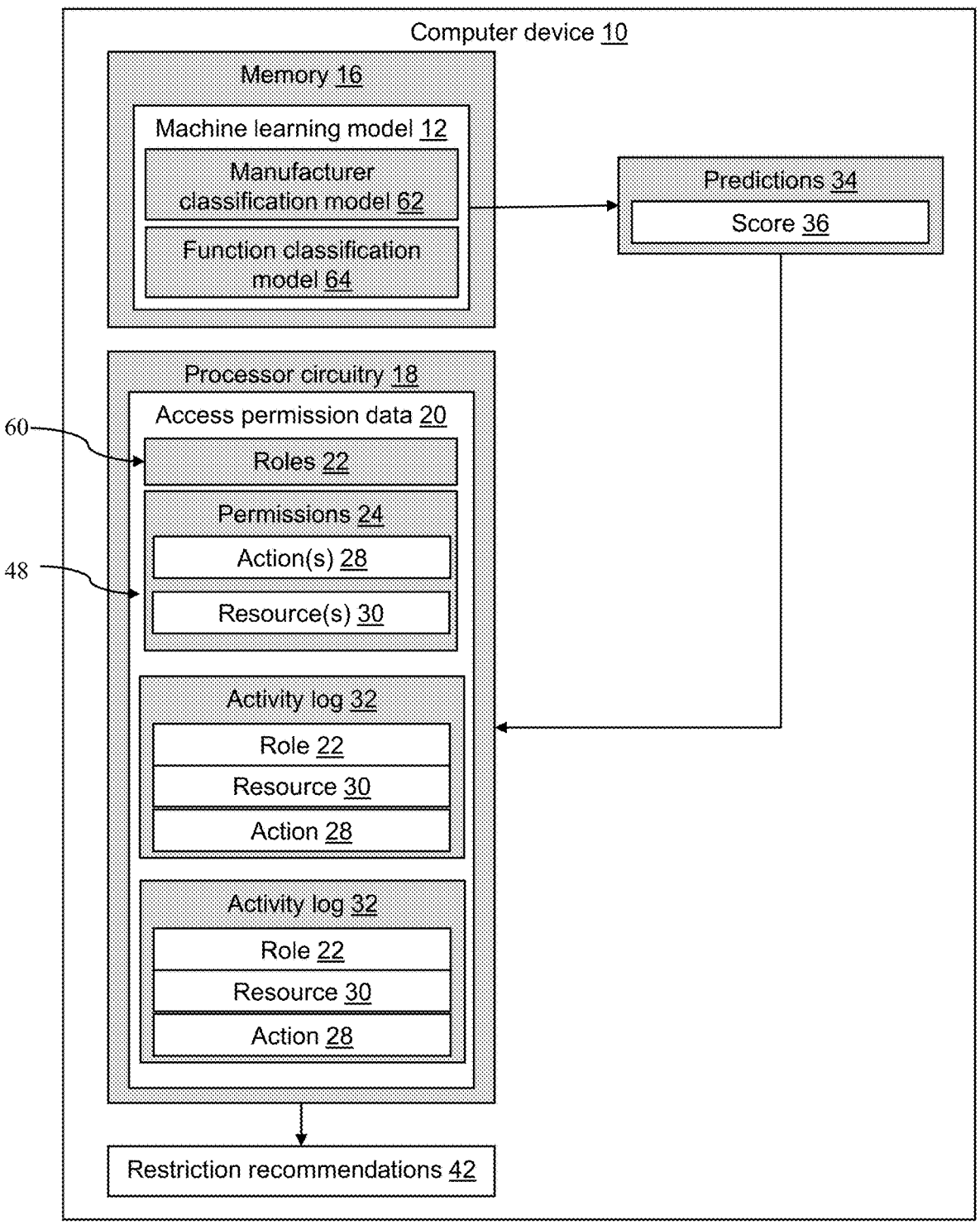
FIG. 1 is an exemplary diagram of a computer device for applying a machine learning model to predict necessary user permissions in a network environment.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

A novel computer device is described herein that employs a machine learning model to intelligently predict user permissions within a network environment. This innovation addresses challenges in contemporary network systems, where managing and predicting user permissions can be convoluted due to the varying needs and roles of users. For example, the disclosure provides herein a robust framework for dynamic permission management, balancing operational requirements with security imperatives in a network environment.

Figures 2, 3:
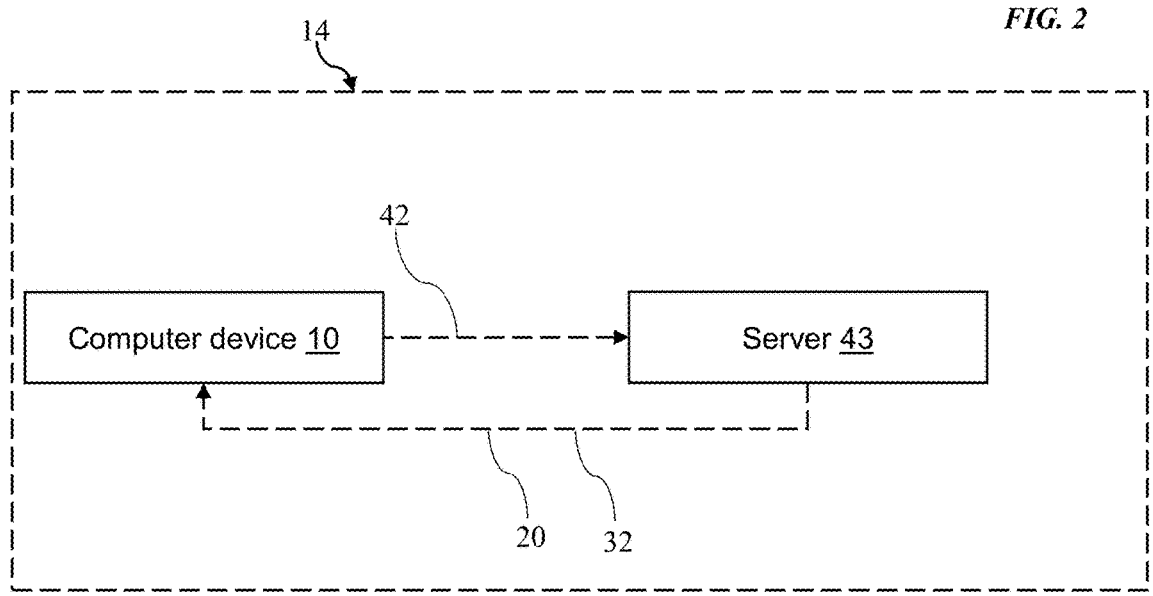
FIG. 2 is an exemplary diagram of network communication between the computer device of FIG. 1 and a server.
FIG. 3 is an exemplary diagram of a matrix of predictions concerning necessary user permissions.

Turning to FIGS. 1 and 2, a computer device 10 is shown for using a machine learning model 12 to predict necessary user permissions in a network environment 14. The computer device 10 includes a non-transitory computer readable medium (memory) 16 and processor circuitry 18. The memory 16 stores the machine learning model 12, which analyzes and predicts user permission needs. The processor circuitry 18 receives (also referred to as obtaining access to) permission data 20. The permission data 20 includes information concerning multiple roles 22 available in the network environment 14, the permissions 24 allocated to each role 22, and the specific users who have been designated these roles 22. As is described in further detail below, each permission 24 delineates a specific set of actions 28 that can be executed, as well as the resources 30 within the network on which these actions 28 may be performed.

In addition to the permission data 20, the processor circuitry 18 also receives activity logs 32. These logs 32 are historical records capturing user activities over a certain duration of time. For example, the logs 32 may cover the last seven days, thirty days, ninety days, one year, or any other suitable duration of time. Each record 32 in these logs corresponds to a specific role 22, detailing the resource 30 targeted and the action 28 executed by the role 22 on that resource 30. The processor circuitry 18 applies the machine learning model 12 to the access permission data 20 with the activity logs 32 to generate predictions 34. Each prediction 34 includes an associated role 22, an associated action 28, and a score 36. The score 36 specifies a probability that the associated action would be required in the future by a user assigned to the associated role. That is, the score 36 is a probabilistic measure, indicating the likelihood of a user, designated to a particular role, requiring that specific action in future scenarios.

The predictions 34 output by the machine learning model 12 are further analyzed by the processor circuitry 18 to generate restriction recommendations 42. That is, the predictions 34 with scores 36 falling below a designated threshold are flagged as elimination candidates. For each such candidate, the processor circuitry 18 performs a twofold analysis. If the associated role did not execute the anticipated action, as per historical logs, the action is suggested for removal from the role. Conversely, if the role did execute the action, the processor circuitry 18 discerns the resources impacted and suggests restricting that action for the role, narrowing it down only to those identified resources. The processor circuitry 18 outputs the restriction recommendation 42. This recommendation 42 is structured to guide network administrators or automated systems in refining and optimizing role-based permissions, ensuring a secure and efficient network environment.

The activity logs and permission data may be received from a server 43 of the network environment 14. For example, the server 43 may be a computing entity designed to offer services within a cloud computing framework. This server 43, rather than being a standalone or isolated unit, may operate within a distributed and interconnected architecture, facilitating the delivery of scalable and on-demand resources, applications, or data to users over the internet. The server 43 may also receive and implement restriction recommendation received from the processor circuitry 18. In one embodiment, the server 43 includes the processor circuitry 18 that generated the restriction recommendation.

The term permission, as used herein, may refer to an authorization construct which governs the ability of users or entities to interact with designated resources in a predefined manner. A permission may be characterized by the following attributes: set of actions, set of resources, and action-resource validation.

Every permission may include a set of one or more actions. These actions define the specific operations or tasks that can be performed. Examples of such actions might include, but are not limited to, read, write, delete, and execute. The specific nature and definition of these actions are contingent upon the environment or system wherein the permission is utilized.

Alongside the aforementioned actions, every permission may also be associated with a set of one or more resources. Resources here may refer to specific objects, databases, files, or any other tangible or intangible item that can be acted upon. For example, for an action to be considered valid under the scope of a given permission, the targeted resource must be a part of this set of resources.

An action on a resource, according to a permission, may be deemed permissible when (e.g., if and only if) the action is encompassed within the set of actions, and the targeted resource is encompassed within the set of resources. Any deviation from this rule may be considered a violation of the permission structure.

A role may embody a hierarchical or structural element in the permission system that aggregates multiple permissions for the purpose of streamlined management and assignment. Each role may be defined by its inherent set of permissions. By amalgamating multiple permissions, a role may represent a broad-spectrum authorization level, allowing entities that have assumed that role to perform a range of actions on a diverse set of resources.

Roles may be earmarked and assigned to individual users or to a collective group of users. Upon such assignment, the respective user or group inherits all the permissions that the role encompasses. Once a role is assigned to a user, said user becomes inherently associated with all the permissions that the role carries. This association ensures that the user can act upon resources as defined by the permissions within the role. For example, in cloud environments like Amazon Web Services (AWS), roles are ascribed to users by an overseeing organization. Following this assignment, users can initiate their AWS session and leverage the permissions attached to their roles. As an example, in such systems the user may have the ability to choose a role upon login. This means users, upon initiation of their session, can opt to assume a specific role from possibly multiple roles assigned to them, dictating their access and action levels for that session based on the chosen role's permissions.

The activity logs 32 may encapsulate various details to document the operations performed within the network environment (also referred to as a cloud ecosystem) over the duration of time. For example, a log entry may include the user 26, the role 22, the action 28, and the resource 30. As described above, the user 26 may denote the individual or the system identity that initiated the action 28. As an example, the user may be identified by name, a system ID, or any unique identifier that denotes who performed the operation. The user may not be a human being, but could also be an automated agent. The role 22 may range from 'Administrator' and 'Developer' to more specific titles like 'Database Manager' or 'Network Operator'. The action 28 may be a descriptor of what the user did. For example, actions can be as broad as 'Logged In' or 'Logged Out', or as specific as 'Created Virtual Machine', 'Deleted Storage Bucket', or 'Modified Network Security Group'. As is described in greater detail below, the resource may pertain to the specific asset or entity within the cloud that the user interacted with. Resources, e.g., can be virtual machines, storage blobs, databases, network configurations, or any other entities. The resource 30 may be identified by a unique resource identifier.

The processor circuitry 18 may apply the machine learning model 12 to the received access permission data 20 and the received activity logs 32 using collaborative filtering. Collaborative filtering is a technique used primarily in recommendation systems (also referred to as recommender systems), where past behaviors and interactions of users are analyzed to predict what products or content a user might like in the future. Rather than relying on explicit item characteristics, collaborative filtering identifies patterns based on user-item interactions, such as rating or viewing behaviors. The core idea is that if two users agree on one issue, they will likely agree on others as well, allowing the system to recommend items based on the preferences of similar users. This method has been adopted in platforms like movie recommendation sites, e-commerce, and music streaming services.

Turning to FIG. 3, using collaborative filtering may include creating a matrix of cells 44 designated as X. This matrix may be formulated from the earlier received access permission data and the activity logs. For example, the matrix 44 may be a two-dimensional matrix with the first dimension (e.g., rows) corresponding to the roles 22, and the second dimension (e.g., columns) corresponding with the various actions 28. Consequently, each cell within this matrix 44 signifies a unique pairing of a role 22 and an action 28. The value 48 stored in each cell may indicate whether or not the paired role executed the associated action in the received activity logs 32. For example, in FIG. 3, the rows of the matrix represent roles 22a-22h and the columns of the matrix represent actions 28a-28f, with the values 48aa-48hf indicating whether the role associated with the cell performed the action associated with the cell. As described below, the value 48 may be a Boolean value, a count of how many times the role performed the action, or any other suitable value.

Performing the collaborative filtering may also include creating two matrices U and V and iteratively adjusting the values within matrices U and V such that their product (U*V) approximately replicates matrix X. This iterative adjustment may seek to minimize a predefined loss function (e.g., U*V−X), ensuring that the differences between matrix X and the product of matrices U and V are minimized. For example, the loss function may be minimized using the Funk Matrix Factorization (MF) method, SVD++ algorithm, Asymmetric SVD, Deep-Learning MF, or Group-specific SVD. The resultant product U*V may act as the predictions generated by the machine learning model, with each cell's value indicating a probability that the paired role requires the use of the paired action.

In one embodiment, the matrix 44 may be a Boolean matrix. In this representation, each cell of the matrix adopts a Boolean value. This value (e.g., True or False, 0 or 1, etc.) indicates whether the specific role, as associated with the cell, executed the mapped action in the activity logs 32.

In another embodiment, matrix X takes the form of a count matrix. In this form, every cell denotes a count value, representing a number of times with which the associated role executed the corresponding action within the activity logs 32. The count matrix may be normalized. For example, every cell's value in the count matrix may be normalized utilizing a specific numerical statistic. This statistic acts as a measure of the cell's importance, ensuring that the matrix offers a balanced and scaled representation that can enhance the efficacy of the collaborative filtering process. For example, the count matrix may be normalized using TF-IDF (Term Frequency-Inverse Document Frequency).

In one embodiment, resources may be identified in the received activity logs using a distinct resource identifier. The resource identifier may include multiple substrings, which may include wildcards matching multiple resources, rather than pinpointing a singular, specific resource. To manage and interpret these varying resource identifiers, the processor circuitry 18 may generate and utilize a data structure. In one embodiment, the data structure is a Trie.

As an example, the activity logs records may include the following records including distinct resource identifiers (e.g., Action 1) and records including a resource identifier containing the following wildcard (e.g., Action 2).

(Action1, arn:aws:iam:012345678912:db/my-db-1)
(Action1, arn:aws:iam:012345678912:db/my-db-2)
(Action2, arn:aws:iam:012345678912:db:*)

In this example, the wildcard "*" may refer to any resource in this format (e.g., as in a regular expression). In the above, Action2 was executed on resource "arn:aws:iam:012345678912:db:*", indicating that Action2 may have been executed on the resource "arn:aws:iam:012345678912:db/my-db-1". Because it cannot be determined which resource Action2 was performed on, the processor circuitry 18 cannot recommend removing this resource from the role. That is, the processor circuitry 18 cannot recommend removing an action from a resource identifier including a wild card. To overcome this problem, the processor circuitry 18 use the data structure to query an input resource identifier to determine a generic resource identifier.

The data structure may be used to facilitate the derivation of a generic resource identifier for any given input resource identifier. To generate the data structure, the processor circuitry 18 may split the resource identifiers from the received activity logs into ordered parts. For example, these parts may be substrings aligned in the order of their appearance within the resource identifier. Beginning with the first part (i.e., the part that appears first in the resource identifier), each of these parts may be sequentially embedded as a node within the data structure, giving rise to a tree-structured hierarchy. For example, if a part already exists as a node in the data structure, then the part may not be added. That is, only if the part does not exist at the current location in the data structure, then the part may be added as a node. The processor circuitry 18 may then use this data structure to pre-process the activity logs.

Continuing the above example, the data structure may include nodes including: a value, children (e.g., a dictionary), and a Boolean value indicating whether the node is an end of a branch. For each resource identifier, the processor circuitry 18 splits it into parts. For example: [arn:aws:iam:012345678912: db/, my-db-1]. Each part (substring) may be inserted as a new node (unless it already exists) in the previous node's children. In this example, the first element (i.e., the part at the beginning of the resource identifier) may be inserted to the root of the data structure (unless it already exists). All nodes in the data structure will have a Boolean value of False except for the last node, which will have a Boolean value of True. For example, the data structure obtained for the three resource identifiers supplied above may be:

$$arn \rightarrow : \rightarrow aws \rightarrow : \rightarrow iam \rightarrow : \rightarrow : \rightarrow 012345678912 \rightarrow : \rightarrow db \rightarrow / \rightarrow \{my\text{-}db\text{-}1, my\text{-}db\text{-}2, *\}$$

Once the data structure has been built, the processor circuitry 18 may query the data structure with a resource identifier to obtain the most generic resource identifier by: splitting the input resource identifier into its parts; walking down the data structure (e.g., for every node, find the most generic value that matches the current part of the input resource identifier). In this example, for the resource identifier "arn:aws:iam:012345678912:db/my-db-1", the obtained generic resource identifier is "arn:aws:iam:012345678912:db/*". The generic resource identifier includes "*", because it is the most generic value that matches my-db-1' from the possible values {my-db-1, my-db-2, *}.

In one embodiment, for each of the received activity logs, the processor circuitry 18 may query the data structure using the resource identifier of the activity log to find a generic resource identifier. The found generic resource identifier may then be used as the resource identifier of the activity log.

In one embodiment, the activity logs specify the action and resource being performed based on the user (i.e., not the role). The processor circuitry 18 may then determine the role associated with the action and resource of the activity logs based on the received user data. That is, the user data may be analyzed to ascertain the role assigned to the user that enabled the user to perform the action on the resource. This role may then be added to the activity log.

The processor circuitry 18 may have various implementations. For example, the processor circuitry 18 may include any suitable device, such as a processor (e.g., CPU, Graphics Processing Unit (GPU), Tensor Processing Unit (TPU), etc.), programmable circuit, integrated circuit, memory and I/O circuits, an application specific integrated circuit, microcontroller, complex programmable logic device, other programmable circuits, or the like. The processor circuitry 18 may also include a non-transitory computer readable medium, such as random-access memory (RAM), a read-only memory (ROM), an erasable programmable read-only memory (EPROM or Flash memory), or any other suitable medium. Instructions for performing the method described below may be stored in the non-transitory computer readable medium and executed by the processor circuitry 18. The processor circuitry 18 may be communicatively coupled to the computer readable medium and a network interface through a system bus, mother board, or using any other suitable structure known in the art.

The computer readable medium (memory) 16 may be, for example, one or more of a buffer, a flash memory, a hard drive, a removable media, a volatile memory, a non-volatile memory, a random-access memory (RAM), or other suitable device. In a typical arrangement, the computer readable medium 16 may include a non-volatile memory for long term data storage and a volatile memory that functions as system memory for the processor circuitry 18. The computer readable medium 16 may exchange data with the processor circuitry over a data bus. Accompanying control lines and an address bus between the computer readable medium 16 and the processor circuitry also may be present. The computer readable medium 16 is considered a non-transitory computer readable medium.

The computer device 10 may encompass a wide range of computing devices suitable for performing the disclosed functions and methods. This includes but is not limited to servers, desktop computers, network switches, routers, laptops, mobile devices, tablets, and any other computerized device capable of executing software instructions. The computer device 10 may include standard components such as a processor, memory, storage, input/output interfaces, and other necessary elements to execute the methods effectively.

Furthermore, the computer device 10 is not limited to a single device but may be embodied in a distributed computing environment. In such an environment, multiple interconnected devices may collaborate and work in unison to execute the computational steps of the methods and functions.

Figure 4:
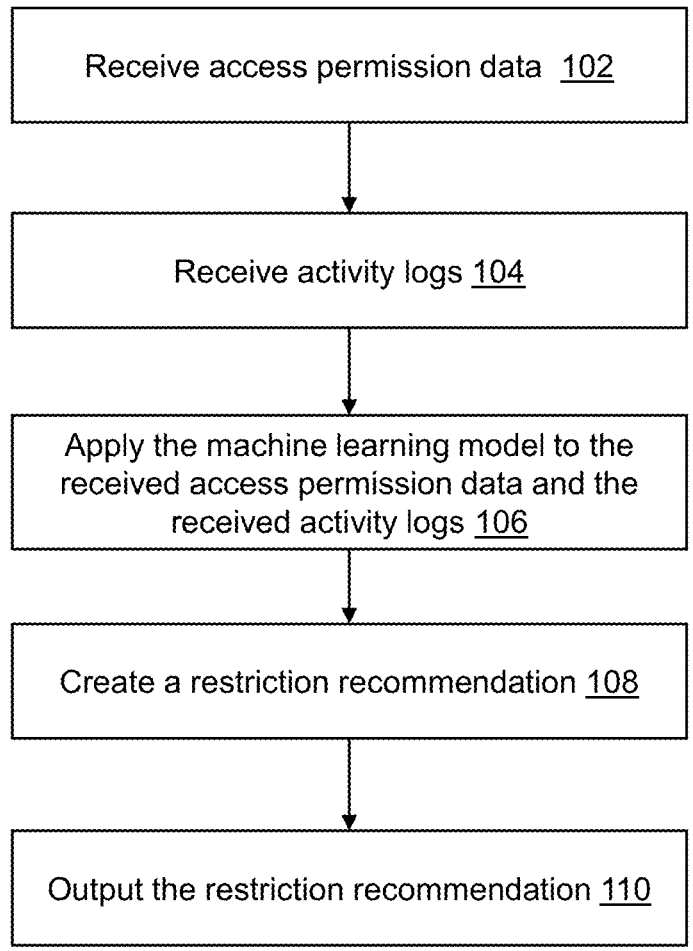
FIG. 4 is an exemplary flow diagram of a method for using processor circuitry to apply a machine learning model to predict necessary user permissions in a network environment.

Turning to FIG. 4, a method 100 is shown for using processor circuitry to apply a machine learning model stored in a non-transitory computer readable medium to predict necessary user permissions in a network environment. The method 100 involves processor circuitry executing the described steps to facilitate the classification process.

In step 102, the method 100 receives access permission data 20. As described above, the access permission data 20 includes multiple roles, permissions associated with each of the multiple roles, and user data identifying users assigned to each of the multiple roles.

In step 104, the method 100 receives activity logs 32. As described above, the activity logs 32 includes records of user activities over a duration of time. Each activity log identifies a particular role of the multiple roles, a particular resource, and a particular action performed by the particular role on the particular resource.

In step 106, the method 100 applies the machine learning model 12 to the received access permission data and the received activity logs, such that the machine learning model outputs predictions. In step 108, a restriction recommendation is created. In step 110, the restriction recommendation is output. The method 100 may also include implementing the restriction recommendation (e.g., by a server of the network environment).

The method 100 described herein may be performed using any suitable computerized device. For example, the method may be executed on a desktop computer, a laptop, a server, a mobile device, a tablet, or any other computing device capable of executing software instructions. The device may include a processor, memory, storage, input/output interfaces, and other standard components necessary for executing the method. The method 100 is designed to be platform-independent and can be implemented on various operating systems, such as Windows, macOS, Linux, or mobile operating systems like iOS and Android. Furthermore, the method may also be performed in a distributed computing environment, where multiple interconnected devices work collaboratively to execute the computational steps of the method.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A computer device for using a machine learning model to predict necessary user permissions in a network environment, the computer device comprising:
   memory comprising a non-transitory computer readable medium storing the machine learning model;
   processor circuitry configured to:
      receive access permission data including:
         multiple roles;
         permissions associated with each role, wherein each permission identifies a set of one or more permitted actions and a set of one or more permitted resources of the network environment that the one or more permitted actions may be performed on; and
         user data identifying users assigned to each of the multiple roles;
      receive activity logs comprising records of user activities over a duration of time, wherein each activity log identifies a particular role of the multiple roles, a particular resource, and a particular action performed by the particular role on the particular resource;
      apply the machine learning model to the received access permission data and the received activity logs, such that the machine learning model outputs predictions, wherein:

each prediction identifies an associated role, an associated action, and a score; and
the score specifies a probability that the associated action would be required in the future by a user assigned to the associated role;
create a restriction recommendation by:
identifying as elimination candidates each prediction having a score below a threshold;
for each of the elimination candidates:
when the associated role did not perform the associated action in the received activity logs, include in the restriction recommendation a recommendation to remove the associated action from the associated role;
when the associated role did perform the associated action in the received activity logs, identify the resources that the associated role performed the associated action on and include in the restriction recommendation a recommendation to restrict the associated action for the associated role to being performed on the identified resources;
output the restriction recommendation;
wherein the processor circuitry is configured to apply the machine learning model to the received access permission data and the received activity logs using collaborative filtering by:
generating from the received access permission data and the received activity logs a matrix of cells X having a first dimension representing roles and a second dimension represents actions, such that each cell of the matrix X represents an associated role and an associated action and a value of the cell identifies whether the associated role performed the associated action in the training data;
creating two matrices U and V and iteratively modifying the values in U and V to minimize a loss function measuring a difference between matrix X and a product of matrices U and V (U*V), where each cell in U*V represents a paired role and a paired action and a value of the cell represents a probability that the paired role requires the use of the paired action; and
outputting U*V as the predictions of the machine learning model, wherein the value of each of the cells in U*V represents one of the predictions.

2. The computer device of claim 1, wherein the matrix X comprises a Boolean matrix with each cell having a Boolean value identifying whether the associated role performed the associated action in the training data.

3. The computer device of claim 1, wherein the matrix X comprises a count matrix with each cell identifying a count of how many times the associated role performed the associated action in the training data.

4. The computer device of claim 3, wherein the processor circuitry is further configured to normalize the value of each cell of the count matrix using a numerical statistic representing a measure of an importance of each cell.

5. The computer device of claim 1, wherein:
the received activity logs specify a particular user, the particular action, and the particular resource; and
the processor circuitry is further configured to pre-process the received activity logs before applying the machine learning model to the activity logs by:
for each activity log, determining the particular role associated with the activity log based on the particular user associated with the activity log and a role that the particular user is assigned to in the received user data.

6. A computer device for using a machine learning model to predict necessary user permissions in a network environment, the computer device comprising:
memory comprising a non-transitory computer readable medium storing the machine learning model;
processor circuitry configured to:
receive access permission data including:
multiple roles;
permissions associated with each role, wherein each permission identifies a set of one or more permitted actions and a set of one or more permitted resources of the network environment that the one or more permitted actions may be performed on; and
user data identifying users assigned to each of the multiple roles;
receive activity logs comprising records of user activities over a duration of time, wherein each activity log identifies a particular role of the multiple roles, a particular resource, and a particular action performed by the particular role on the particular resource;
apply the machine learning model to the received access permission data and the received activity logs, such that the machine learning model outputs predictions, wherein:
each prediction identifies an associated role, an associated action, and a score; and
the score specifies a probability that the associated action would be required in the future by a user assigned to the associated role;
create a restriction recommendation by:
identifying as elimination candidates each prediction having a score below a threshold;
for each of the elimination candidates:
when the associated role did not perform the associated action in the received activity logs, include in the restriction recommendation a recommendation to remove the associated action from the associated role;
when the associated role did perform the associated action in the received activity logs, identify the resources that the associated role performed the associated action on and include in the restriction recommendation a recommendation to restrict the associated action for the associated role to being performed on the identified resources;
output the restriction recommendation;
wherein:
the resources are identified in the received activity logs using a resource identifier comprising multiple substrings;
the received activity logs include logs having a resource identifier including as one of its multiple substrings a wildcard matching multiple resources;
the processor is further configured to:
build a data structure for generating a generic resource identifier for an input resource identifier comprising:
for each resource identifier of the received activity logs:
split each resource identifier into ordered parts, wherein each part is a substring of the multiple substrings and the parts are ordered based on their location in the resource identifier; and starting from a first in order of the parts, inserting each of the parts as a node in the data structure, such that the data structure has a tree structure; and preprocess the received activity logs before applying the machine learning model to activity logs by:

for each of the received activity logs:

querying the data structure using the resource identifier of the activity log to find a generic resource identifier; and using the found generic resource identifier as the resource identifier of the activity log.

7. The computer device of claim 6, wherein the data structure comprises a Trie.

8. The computer device of claim 6, wherein the processor circuitry is configured to apply the machine learning model to the received access permission data and the received activity logs using collaborative filtering by:

generating from the received access permission data and the received activity logs a matrix of cells X having a first dimension representing roles and a second dimension represents actions, such that each cell of the matrix X represents an associated role and an associated action and a value of the cell identifies whether the associated role performed the associated action in the training data;

creating two matrices U and V and iteratively modifying the values in U and V to minimize a loss function measuring a difference between matrix X and a product of matrices U and V (U*V), where each cell in U*V represents a paired role and a paired action and a value of the cell represents a probability that the paired role requires the use of the paired action;

outputting U*V as the predictions of the machine learning model, wherein the value of each of the cells in U*V represents one of the predictions.

9. The computer device of claim 8, wherein the matrix X comprises a Boolean matrix with each cell having a Boolean value identifying whether the associated role performed the associated action in the training data.

10. The computer device of claim 8, wherein the matrix X comprises a count matrix with each cell identifying a count of how many times the associated role performed the associated action in the training data.

11. The computer device of claim 10, wherein the processor circuitry is further configured to normalize the value of each cell of the count matrix using a numerical statistic representing a measure of an importance of each cell.

12. The computer device of claim 6, wherein:

the received activity logs specify a particular user, the particular action, and the particular resource; and the processor circuitry is further configured to pre-process the received activity logs before applying the machine learning model to the activity logs by:

for each activity log, determining the particular role associated with the activity log based on the particular user associated with the activity log and a role that the particular user is assigned to in the received user data.

13. A method for using processor circuitry to apply a machine learning model stored in a non-transitory computer readable medium to predict necessary user permissions in a network environment, the method comprising:

receiving access permission data including:

multiple roles;

permissions associated with each of the multiple roles, wherein each permission identifies a set of one or more permitted actions and a set of one or more permitted resources of the network environment that the one or more permitted actions may be performed on; and user data identifying users assigned to each of the multiple roles;

receiving activity logs comprising records of user activities over a duration of time, wherein each activity log identifies a particular role of the multiple roles, a particular resource, and a particular action performed by the particular role on the particular resource;

applying the machine learning model to the received access permission data and the received activity logs, such that the machine learning model outputs predictions, wherein:

each prediction identifies an associated role, an associated action, and a score; and the score specifies a probability that the associated action would be required in the future by a user assigned to the associated role;

creating a restriction recommendation by:

identifying as elimination candidates each prediction having a score below a threshold;

for each of the elimination candidates:

when the associated role did not perform the associated action in the received activity logs, include in the restriction recommendation a recommendation to remove the associated action from the associated role;

when the associated role did perform the associated action in the received activity logs, identify the resources that the associated role performed the associated action on and include in the restriction recommendation a recommendation to restrict the associated action for the associated role to being performed on the identified resources; and outputting the restriction recommendation;

wherein the applying of the machine learning model to the received access permission data and the received activity logs is performed using collaborative filtering by:

generating from the received access permission data and the received activity logs a matrix of cells X having a first dimension representing roles and a second dimension represents actions, such that each cell of the matrix X represents an associated role and an associated action and a value of the cell identifies whether the associated role performed the associated action in the training data; and creating two matrices U and V and iteratively modifying the values in U and V to minimize a loss function measuring a difference between matrix X and a product of matrices U and V (U*V), where each cell in U*V represents a paired role and a paired action and a value of the cell represents a probability that the paired role requires the use of the paired action; and outputting U*V as the predictions of the machine learning model, wherein the value of each of the cells in U*V represents one of the predictions.

14. The method of claim 13, wherein the matrix X comprises a Boolean matrix with each cell having a Boolean value identifying whether the associated role performed the associated action in the training data.

15. The method of claim 13, wherein the matrix X comprises a count matrix with each cell having a value based on how many times the associated role performed the associated action in the training data.

16. The method of claim 15, wherein the value of each cell of the count matrix is normalized using a numerical statistic representing a measure of an importance of each cell.

17. The method of claim 13, wherein:
the resources are identified in the received activity logs using a resource identifier comprising multiple substrings;
the received activity logs include logs having a resource identifier including as one of its multiple substrings a wildcard matching multiple resources;
the method further comprises:
building a data structure for generating a generic resource identifier for an input resource identifier comprising:
for each resource identifier of the received activity logs:
splitting each resource identifier into ordered parts, wherein each part is a substring of the multiple substrings and the parts are ordered based on their location in the resource identifier; and
starting from a first in order of the parts, inserting each of the parts as a node in the data structure, such that the data structure has a tree structure; and
preprocessing the received activity logs before applying the machine learning model to activity logs by:
for each of the received activity logs:
querying the data structure using the resource identifier of the activity log to find a generic resource identifier; and
using the found generic resource identifier as the resource identifier of the activity log.

18. The method of claim 17, wherein the data structure comprises a Trie.

19. The method of claim 13, wherein:
the received activity logs specify a particular user, the particular action, and the particular resource; and
the method further comprising pre-processing the received activity logs before applying the machine learning model to the activity logs by:
for each activity log, determining the particular role associated with the activity log based on the particular user associated with the activity log and a role that the particular user is assigned to in the received user data.

20. The method of claim 13, further comprising:
modifying the user permissions in the network environment according to the output restriction recommendation.

* * * * *